FIG.—1

Feb. 14, 1950 J. H. McCLINTOCK ET AL 2,497,177
DIFFERENTIAL GRAVITY SKIMMER
Filed Nov. 27, 1946 2 Sheets-Sheet 2

Patented Feb. 14, 1950

2,497,177

UNITED STATES PATENT OFFICE 2,497,177

DIFFERENTIAL GRAVITY SKIMMER

John H. McClintock, Cranford, N. J., and George D. Priestman, Billings, Mont., assignors to Standard Oil Development Company, a corporation of Delaware Application November 27, 1946, Serial No. 712,644

5 Claims. (Cl. 210—51)

1

The present invention relates to an apparatus for skimming liquids, such as oil, from the surface of another liquid of higher specific gravity, such as water. More particularly the invention relates to an apparatus for skimming oil from the surface of a stream of water flowing in a confined path, as through a flume or culvert. As hereinafter described and claimed, it is also contemplated that the apparatus may be used effectively to skim oil from the surface of larger areas of water by drawing or towing it across the surface of the water in any suitable manner.

The invention may be fully understood from the following specification when read in conjunction with the accompanying drawings, in which Fig. 1 is a plan view, showing the apparatus disposed in a flume or culvert;

Figure 1:
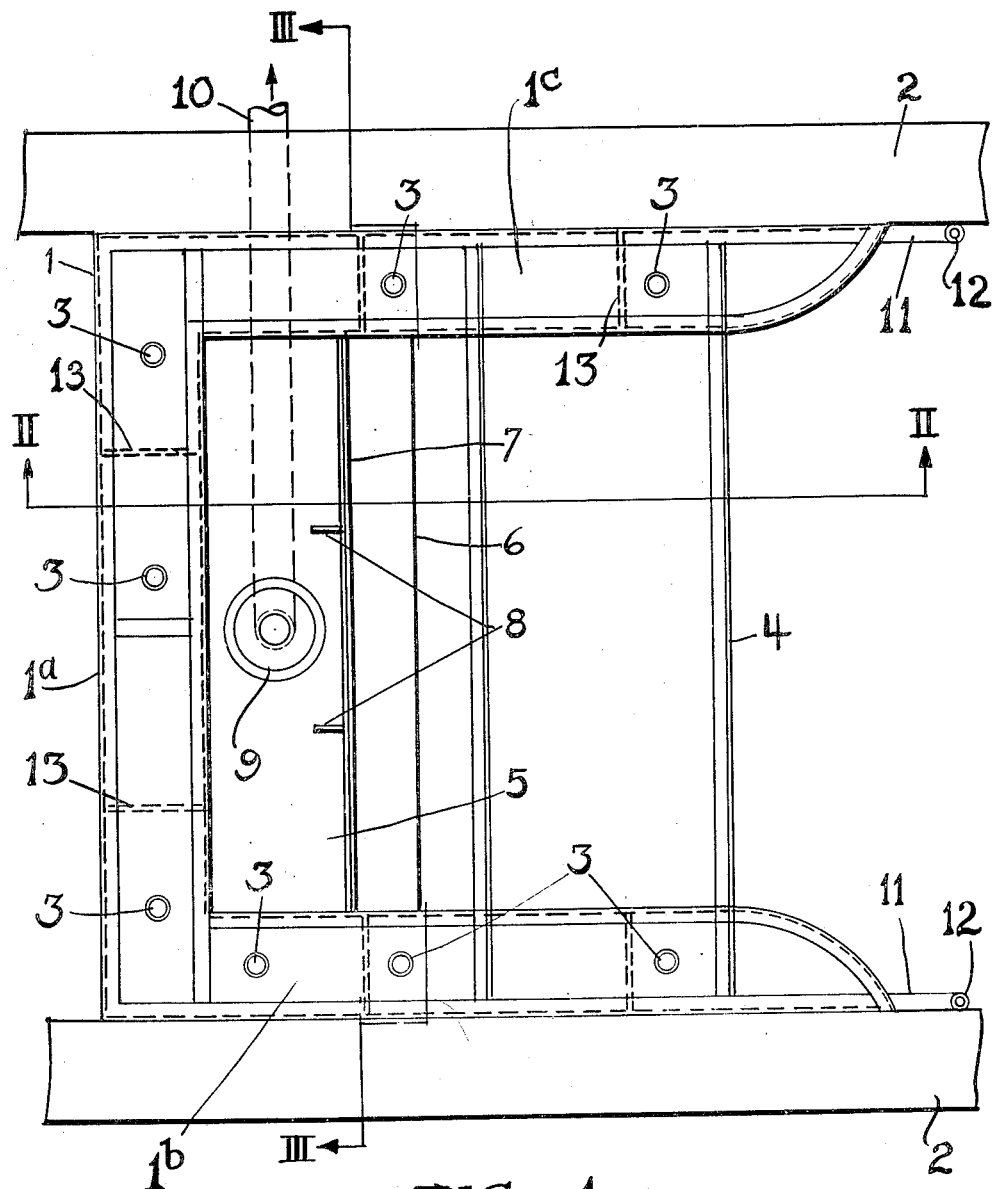

As shown in Fig. 1, the skimmer apparatus comprises a U-shaped float structure 1, composed of a rear pontoon member 1a, forming the base of the U, and two side pontoon members 1b, and 1c respectively. The float 1 is preferably designed to be disposed in a flume or culvert 2, carrying a flowing stream of liquids, with the side members 1b and 1c extending upstream from the member 1a, and in closely spaced relation to the side walls of the flume 2. The upstream ends of the members 1b and 1c are shaped so as to offer the least resistance to liquid flow in the flume and to direct the surface liquid into the apparatus. Each pontoon member is provided with plugged openings 3 so that liquid ballast may be introduced or withdrawn in order to obtain proper submersion of the float as required for operation. The respective pontoon elements are suitably joined and maintained in rigid relation to one another as by a framework 4 of angle iron to which the pontoons may be bolted or welded.

Between the side pontoon members 1b and 1c, at the base of the U, is disposed a skimming pan or receiver 5. This pan may be formed integrally with the float structure or formed separately and mounted on the structure as a unit. As shown, it is composed of a bottom plate inserted horizontally between the side pontoon members 1b and 1c, and secured in liquid tight relation to the walls thereof, and the upstream wall of member 1a, and a baffle 6, including a weir 7, disposed vertically between the side members 1b and 1c in liquid tight relation thereto and to the forward edge of the bottom plate. Suitable stiffening elements 8, and other supporting means may be employed to provide a rigid assembly. The bottom of the skimming pan 5 preferably is formed so as to provide for drainage toward a drain 9 connected to a conduit 10, which may be a rotatably jointed rigid conduit extending through a wall of the passageway 2, or a flexible hose member.

The float member 1 may either be secured against longitudinal movement in the passageway 2 by means of yoke members 11 secured to the pontoons 1b and 1c, or the frame 4, and slidably engaging vertical rods 12 secured to the sidewalls of the passageway, or sometimes it may be possible to maintain the float in relatively fixed position longitudinally of the passageway, merely by means of the rotatably jointed, rigid drain conduit 10.

Preferably the interior of the pontoon members are divided into compartments by means of bulkheads 13, shown by dotted lines, to reduce surging of the liquid ballast, and improve stability of the float.

Figure 2:
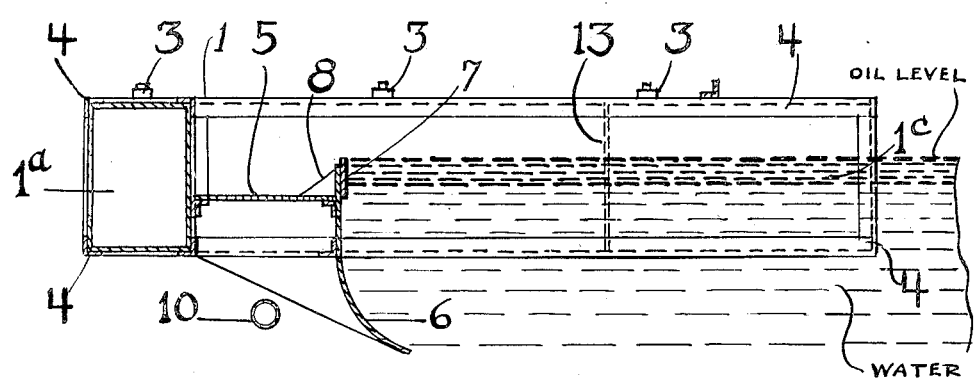
Fig. 2 is a longitudinal section of the apparatus taken along the line II—II of Fig. 1.
Figure 3:
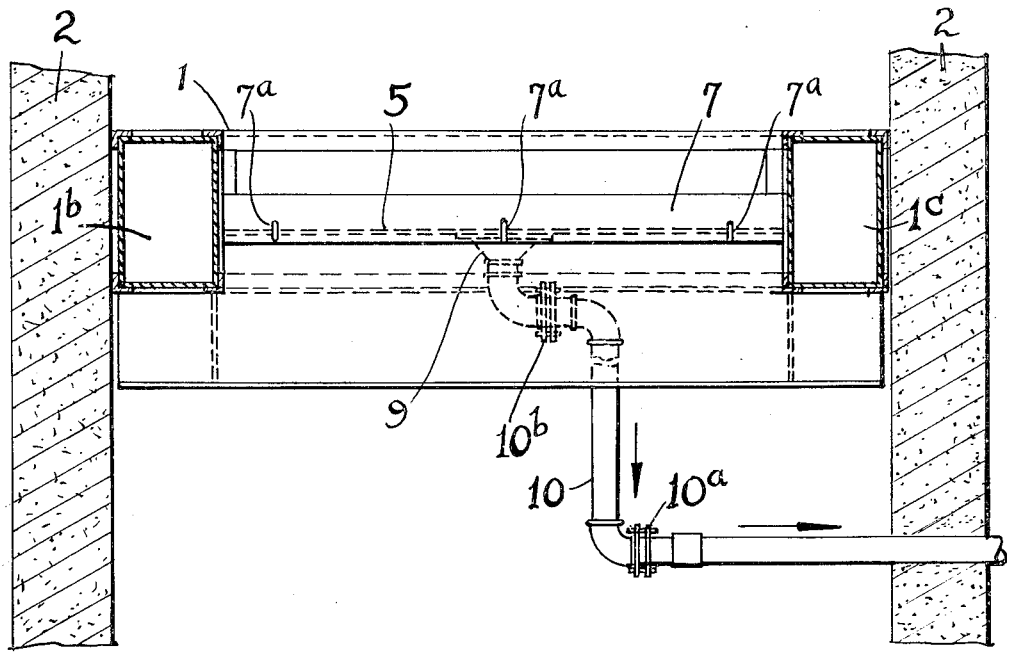
Fig. 3 is a vertical section of the apparatus, taken along the line III—III of Fig. 1, with parts broken away.

In Figs. 2 and 3, the essential elements of the structure are shown in greater detail, as for example the stiffening elements 8 for the skimming pan 5 and baffle 6. As indicated in Fig. 2, the baffle 6 is preferably curved at its lower edge toward the upstream end of the float. The depth of the baffle is preferably such that it depends vertically downward to a point at least twelve inches below the pontoon members and, as shown in Fig. 3 with the dependent portion extending across the full width of the float 1 to the outer wall of the members 1b and 1c.

The weir 7, and the upper edge of the baffle 6 forming the forward side of the skimming pan 5 may be slotted as at 7a to accelerate flow of the skimmed liquid into the pan.

In Fig. 3, the swing jointed drain pipe is shown in its connection to the skimming pan 5, at the drain 9, including swing joints 10a and 10b.

In operation, with the apparatus disposed between the side walls of a flume as shown in Fig. 1, the flow of liquid to be removed from a flowing stream of liquids in the flume is impeded by the baffle 6, and tends to accumulate above the normal level of liquids in the flume until it reaches the top of the weir 7, over which it spills into the pan 5, or flows through the slotted openings 7a in the weir, and is continuously drained off from the pan 5 through the drain 9 and pipe 10. The drain pipe 10 may be connected to a suitable collection tank, not shown, into which the skimmed liquid may drain by gravity, or to which the liquid may be pumped by means of a pump connected in the line 10, beyond the flume 2.

In the event that the apparatus is to be drawn or towed across the surface of a larger body of liquids, a flexible hose connection may be substituted for the rotatably jointed pipe 10, the hose leading to a suitable suction pump for withdrawing the skimmed liquid from the pan 5.

Although the invention has been described in its preferred embodiment, it is to be understood that various modifications and alternate arrangements are possible without departing from the inventive concept disclosed. It is not intended that the invention shall be limited by such specific description or illustration as has been set forth for the purpose of disclosure, but only by the appended claims.

We claim:

1. An apparatus of the character described, comprising a substantially U-shaped float member, including a base float portion and oppositely disposed wing float portions, said base and wing float portions defining a confined collecting area open at one end and closed at the other, a skimming pan within said area, extending laterally across the closed end thereof, in liquid tight relation to said base and wing float portions, a baffle and weir secured to the outer edge of said pan, the baffle member depending downwardly therefrom below the float member and extending laterally across the full width of the float member, and a conduit flexibly connected with said skimming pan to drain therefrom liquid collected in said pan.

2. An apparatus according to claim 1 in which the skimming pan is integral with the U-shaped float member, the base and wing float portions forming three walls thereof.

3. In an apparatus according to claim 1, a substantially U-shaped float member comprising a rigid U-shaped box frame member and individual base and wing float portions removably secured in said frame in fixed relation one to another.

4. Apparatus for skimming a liquid material from the surface of a stream of another liquid of higher specific gravity flowing in a confined path in a walled passageway, comprising a U-shaped float member, having an open end and a closed end, disposed in said passageway with its open end upstream, and the legs of said U-shaped float in closely spaced relation to the walls of said passageway, a skimming pan across the closed end of said U-shaped float member on the upstream side thereof, including baffle and weir members forwardly of said pan, said baffle depending below said float and extended laterally across the full width thereof, a rotatably jointed, rigid conduit drain connected with said skimming pan and extending laterally through a sidewall of said passageway, and means for securing said float to said sidewalls in a relatively fixed position longitudinally of the passageway.

5. Apparatus according to claim 4, in which said means for securing the float in the passageway consists of said conduit drain extending laterally through a side wall of the passageway.

JOHN H. McCLINTOCK.
GEORGE D. PRIESTMAN.

REFERENCES CITED

The following references are of record in the file of this patent:

UNITED STATES PATENTS

| Number | Name | Date |
| --- | --- | --- |
| 42,073 | Cannon | Mar. 29, 1864 |
| 61,880 | Serrell | Feb. 5, 1867 |
| 95,089 | Cowley | Sept. 21, 1869 |
| 1,397,892 | Jones | Nov. 22, 1921 |
| 1,450,545 | Hans | Apr. 3, 1923 |
| 1,843,329 | Lathrop | Feb. 2, 1932 |
| 2,078,266 | Morehead | Apr. 27, 1937 |